US008924973B2

(12) United States Patent
Arcese et al.

(10) Patent No.: US 8,924,973 B2
(45) Date of Patent: Dec. 30, 2014

(54) MEASURING TRANSACTION PERFORMANCE ACROSS APPLICATION ASYNCHRONOUS FLOWS

(71) Applicant: International Business Machines Corporation, Armonk, NY (US)

(72) Inventors: Mauro Arcese, Rome (IT); Antonio Perrone, Rome (IT); Sandro Piccinini, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/767,545

(22) Filed: Feb. 14, 2013

(65) Prior Publication Data

US 2013/0174156 A1 Jul. 4, 2013

Related U.S. Application Data

(63) Continuation of application No. 13/307,338, filed on Nov. 30, 2011.

(30) Foreign Application Priority Data

Dec. 10, 2010 (EP) .................................... 10194442

(51) Int. Cl.
*G06F 9/455* (2006.01)
*G06F 9/46* (2006.01)
*G06F 3/0481* (2013.01)
*G06F 11/34* (2006.01)
*G06F 9/48* (2006.01)
*G06F 11/36* (2006.01)

(52) U.S. Cl.
CPC ........ *G06F 9/45504* (2013.01); *G06F 3/04812* (2013.01); *G06F 11/34* (2013.01); *G06F 9/4881* (2013.01); *G06F 11/36* (2013.01)
USPC ............................................. 718/1; 718/104

(58) Field of Classification Search
CPC ......... G06F 9/46; G06F 9/4881; G06F 11/36; G06F 3/04812; G06F 9/45504; G06F 11/34
USPC .......................................................... 718/104
See application file for complete search history.

(56) References Cited

U.S. PATENT DOCUMENTS 7,310,777 B2 12/2007 Cirne
7,484,209 B2 1/2009 Avakian et al.
(Continued)

OTHER PUBLICATIONS

U.S. Appl. No. 13/307,338.
(Continued)

Primary Examiner — Camquy Truong
(74) Attorney, Agent, or Firm — Stephen R. Tkacs; Stephen J. Walder, Jr.; Jeffrey S. LaBaw

(57) ABSTRACT

A mechanism modifies a deployment descriptor of each application component including at least one producer application component or consumer application component, by adding, for each producer application component or consumer application component, an application component identifier, a producer or consumer type, and a recipient identifier of a recipient the application component uses. Responsive to determining a match exists and the given application component is of producer type, the application server virtual machine logs an identifier of a recipient containing a message sent by the given application component, a correlation identifier of the given application component, and an execution start time. Responsive to determining a match exists and the given application component is of consumer type, the application server virtual machine logs an identifier of the recipient resource containing a message processed by the given application component, a correlation identifier of the given application component, and an execution end time.

27 Claims, 3 Drawing Sheets

(56) References Cited

U.S. PATENT DOCUMENTS

| | | | |
|---|---|---|---|
| 7,505,953 | B2 | 3/2009 | Doshi |
| 7,552,212 | B2 | 6/2009 | Chagoly et al. |
| 8,271,993 | B2 * | 9/2012 | Keladi .................. 718/106 |
| 2005/0039171 | A1 | 2/2005 | Avakian et al. |
| 2007/0011330 | A1 | 1/2007 | Dinker et al. |
| 2008/0016213 | A1 * | 1/2008 | Akinaga et al. ........... 709/226 |
| 2008/0307088 | A1 | 12/2008 | Chen |
| 2009/0049429 | A1 | 2/2009 | Greifeneder et al. |

OTHER PUBLICATIONS

"Application Response Measurement—ARM", The Open Group, opengroup.org/arm/, printed Nov. 23, 2011, 1 page.

"Applications Manager", .manageengine.com/products/applications_manager/webtransaction-monitoring.html, printed Nov. 23, 2011, 3 pages.

"Assembling applications", IBM Corporation, publib.boulder.ibm.com/infocenter/wasinfo/v6r0/index.jsp?topic=%2Fcom.ibm.websphere.express.doc%2Finfo%2Fexp%2Fae%2Ftatk_assembling.html, printed Nov. 23, 2011, 3 pages.

"Synthetic Transaction Monitoring", Telehouse, Inc., telehouse.com/MSPDF/SynthTrans_Manage.pdf, 2008, 1 page.

"Transaction Monitoring—The Four Approaches", correlsense, .correlsense.com/resources/267/15/transaction-monitoring-four-approaches, printed Nov. 23, 2011, 2 pages.

"Transaction Tracking API Guide", IBM Corporation, Composite Application Manager for Transaction, Version 7.1.0.2, printed Nov. 23, 2011, 1 page.

Fan, Shenfu, "Generating events in WebSphere Message Broker for transaction monitoring and auditing", IBM Corporation, .ibm.com/developerworks/websphere/library/techarticles/0911_fan/0911_fan.html, printed Nov. 23, 2011, 20 pages.

Powell, James, "Business Transaction Monitoring and Proactive IT Management", Enterprise Systems, esj.com/articles/2010/03/09/btm-proactive-it-mgt.aspx, Mar. 9, 2010, 2 pages.

\* cited by examiner

```
<application version="5" xsi:schemaLocation= "http://java.sun.com/xml/ns/javaee
http://java.sun.com/xml/ns/javaee/application_5.xsd " >
<display-name> MyWebModule</display-name>
<module>
-<web>                       310
-<web-uri> MyWebModule.war</web-uri>
 <context-root> myContextRoot</context-root>         320
</web>
</module>
<correlation-settings>          301
 <transaction-boundary>MyServlet.writeObject </transaction-boundary>
 <transaction-type>W</transaction-type>  302
 <correlation-scope>MyDB.MyTable </correlation-scope>  303
<correlation-settings>                                        300
<security-role>
-<description> Used to guard resources under this url -pattern </description>
 <role-name> Role1</role-name>                                330
</security-role>
</application>
```

FIG. 3

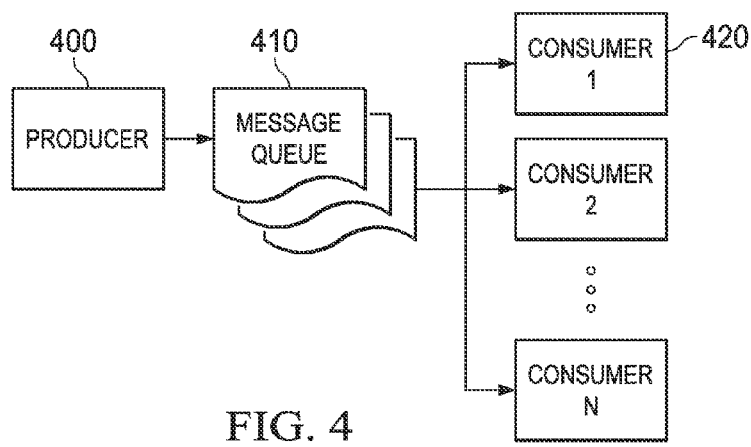

FIG. 4

MEASURING TRANSACTION PERFORMANCE ACROSS APPLICATION ASYNCHRONOUS FLOWS

BACKGROUND

This invention generally relates to transaction performance monitoring; more particularly, the invention aims at measuring response time of transactions tracked across asynchronous flows in a Java (Java and all Java-based trademarks and logos are trademarks or registered trademarks of Oracle and/or its affiliates) 2 Enterprise Edition (J2EE) application server.

In a production environment it is difficult to monitor J2EE application servers because of the debugging constraint problems. In this case it is not possible to use debugging and profiling tools and the most common technique to perform a deeper problem determination apart from browsing log and trace files is to record processing time in each of the components of the application server during a request to that application.

Currently available tools can collect transaction processing time and store in log or trace files for later retrieval and analysis or can send it to protocol agents such as an Application Response Measurement (ARM) (ARM is a trademark of ARM Ltd.) agent which is developed using an application programming interface (API) allowing to track resource consumption by a transaction when several elements in a network are contributing towards the completion of the transaction.

As a transaction flows through the system, these tools include additional information so that the log records from each component can be correlated, building up a complete picture of that transaction. The result provides processing time in each component, as in the following example in which processing time is provided for each software component participating in the completion of one transaction:

```
HTTP request/trade/scenario - - - > 172 ms
Servlet/trade/scenario - - - > 130 ms
EJB TradeEJB.getAccountData - - - > 38 ms
JDBC select - - - > 7 ms
```

The problem with such a solution is that it works only when the transaction within the application is a synchronous flow of calls among any number of components and or applications such as database servers, resource connectors, etc.

There is thus a need to collect processing time for a transaction when the application calls are made across asynchronous components. There is need for correlating the information collected when the application calls are made across asynchronous components like Java Message Service (JMS) resources for sending or receiving messages or when different applications perform independent read/write operations to/from an external data source or when there is the need to propagate a correlation information among different application components.

Known solutions to solve such kind of problems do not completely solve them and/or require to manually hard-code into the application the code that takes care of managing such correlation information. For example, in case of asynchronous transactions based on JMS queues, a typical way to solve this problem is to directly insert into the JMS message an additional parameter containing a correlator token. Such intrusive solution requires to write some custom code to be added to the applications that have to share the correlation information which is not possible when debugging applications operating in production mode and which cannot be modified.

Other solutions are based on on-the-fly instrumenting the application when it is being loaded into the runtime environment and intercepting specific method invocations corresponding to the start/completion of a transaction. But also such solution does not automatically take case of propagating a correlation information among different processes, both synchronous and asynchronous.

The US patent application published under the number US 2005/0039171 under the title "USING INTERCEPTORS AND OUT-OF-BAND DATA TO MONITOR THE PERFORMANCE OF JAVA 2 ENTERPRISE EDITION (J2EE) APPLICATIONS" discloses a runtime bytecode instrumentation of the application classes to locate static code points (always derived by a top level servlet invocation) where a transaction may occur. This prior art solution avoids modifying code source of applications running on a JVM application server, but it only supports transaction based on a pre-defined 'parent child hierarchy' which is static, meaning that the transaction flow is synchronous.

There is thus a need for a method to allow tracking of processing time of a transaction based on execution of a synchronous or asynchronous process flow.

SUMMARY

In one illustrative embodiment, method is provided for identifying processing time of asynchronous transactions in applications running on an application server virtual machine. The asynchronous transactions involve execution in one application component of a producer application component, sending a message into a recipient, and execution in a consumer application component. The method comprises modifying a deployment descriptor of each application component of an application including at least one producer application component or consumer application component, by adding, for each producer application component or consumer application component, an application component identifier, a producer or consumer type, and a recipient identifier of a recipient the application component uses. The method further comprises the application server virtual machine, when executing a transaction using a given application component, determining whether the given application component matches an application component identifier in the deployment descriptor of the given application. The method further comprises responsive to determining a match exists and the given application component is of producer type, the application server virtual machine logging an identifier of a recipient containing a message sent by the given application component, a correlation identifier of the given application component, and an execution start time. The method further comprises responsive to determining a match exists and the given application component is of consumer type, the application server virtual machine logging an identifier of the recipient resource containing a message processed by the given application component, a correlation identifier of the given application component, and an execution end time.

In other illustrative embodiments, a computer program product comprising a computer storage medium having a computer readable program is provided. The computer readable program, when executed on a computing device, causes the computing device to perform various ones of, and combinations of, the operations outlined above with regard to the method illustrative embodiment.

In yet another illustrative embodiment, computing device is provided. The computing device may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

FIG. 3 shows an example of deployment descriptor attached to each component of applications running on a J2EE application server JVM including correlation information according to an example embodiment; and FIG. 4 illustrates a transaction based on Java Message Service (JMS), an asynchronous service, for which aspects of the illustrative embodiments may apply.

DETAILED DESCRIPTION

The proposed solution provides a way to correlate components involved in the execution of a transaction by modifying the deployment descriptor of applications running on the application server JVM. The solution is implemented in the application server JVM runtime and optionally in the assembler and uses existing log filing to collect processing times. This automatic process is transparent for the Java application developer who can write the code of applications running in the application server JVM without worrying about transaction recording and correlation.

The main advantage of the solution is that it is general and may correlate any type of components involved in execution of one J2EE compliant application server transaction. These components may be different components of a same application, they may also correspond to components of different applications running on the same J2EE compliant application server, or to a remote Web server depending on the same application server. These components can also be application processes running on a different J2EE compliant application server implementing the present method of the invention.

As the solution is based on the use of the deployment descriptor attached to each application component running on a J2EE specification for developing application servers, it may be considered by the J2EE developers as an extension of the current implementations they develop. The deployment descriptor being an XML file, it is a flexible solution. The descriptor can be updated by the developer, the administrator or automatically by the application assembler.

A second advantage of the use of a J2EE deployment descriptor is that the numerous existing tools facilitating development of J2EE compliant application servers can be extended for including correlation of components involved in execution of a transaction. There are currently a number of tools that can be used to develop and assemble a J2EE application. The proposed solution enhances these tools to allow the application assembler to define an asynchronous transaction.

Figure 1:
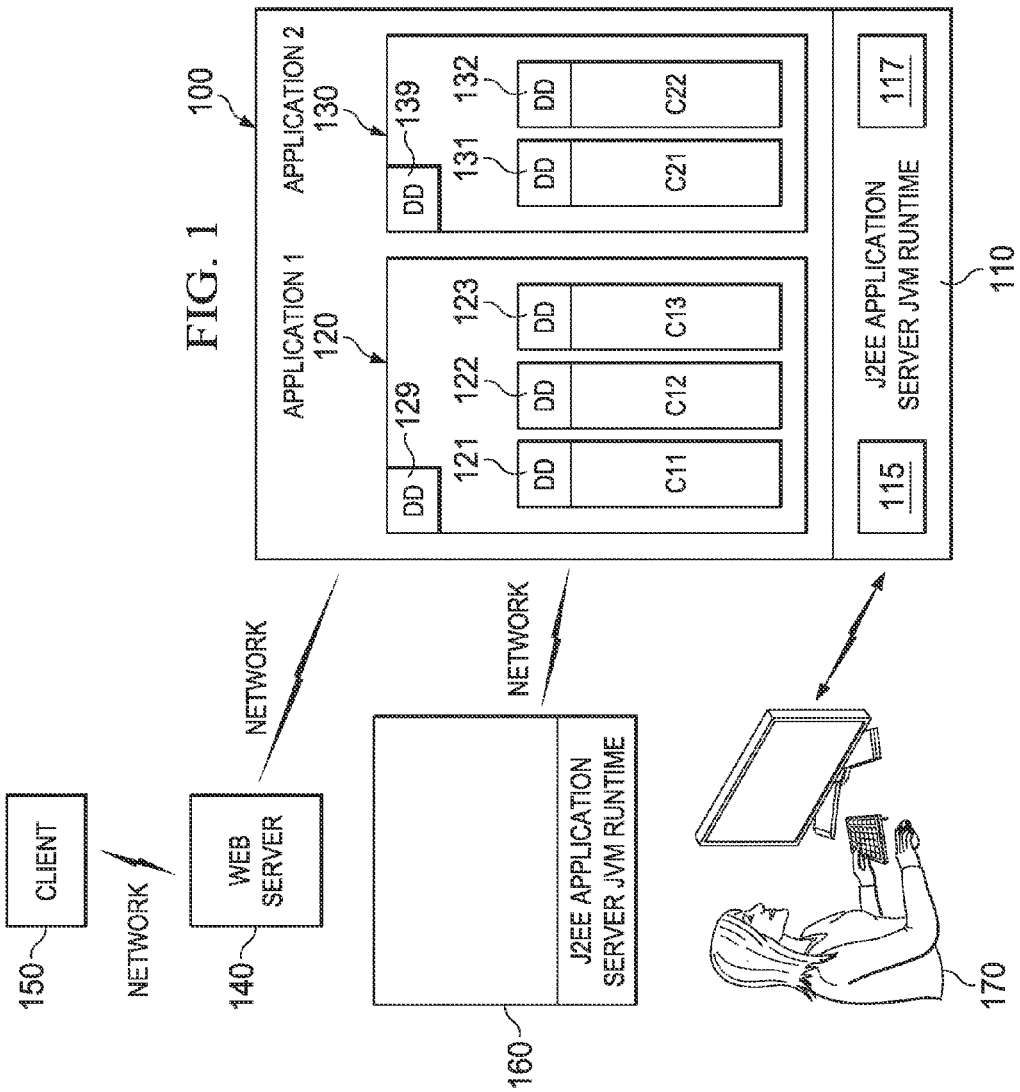
FIG. 1 illustrates a system environment implementing measuring transaction performance across application asynchronous flows according to an illustrative embodiment.

FIG. 1 illustrates a system environment implementing measuring transaction performance across application asynchronous flows according to an illustrative embodiment. In a J2EE compliant Application Server (100) comprising a J2EE compliant application server JVM runtime (110) are running two applications APPL1 (120) and APPL2 (130) which may be Web applications. Each application includes components and the developer defines one deployment descriptor for the application and one deployment descriptor for each component in the application (121, 122, 123, 131, 132). The deployment descriptor content is defined by the J2EE specification. Tools exist to allow the developer to enter/modify the content of the DDs which are XML files. The DD describes the declarative data and assembly instructions of the corresponding component (or application) for the application server JVM. In the preferred embodiment the deployment descriptors of the application components developed on the application server JVM are modified to include information which will help the JVM to correlate all the application component Java class methods involved in execution of one transaction handled by the JVM. As the DD are XML files they can be created by the assembler at assembling time when compiling of application Java code into bytecodes for execution in the JVM. The DD can also be modified by the developer or the system administrator (170) at any time using the application server console to interface the application server JVM for instance for updating the deployment descriptors through a graphical user interface. It is noted that the application server console may be a remote console; this is particularly adapted when the method of the invention is used to make a problem determination of an application server JVM architecture which is used in production mode (debugging of customers for instance). According to an illustrative embodiment the Deployment descriptor GUI allowing the update of the deployment descriptors is modified to allow the administrator or developer or any other authorized person to include update the fields of the correlation settings section which have been initialized by the assembler of the J2EE platform which has also been modified for this purpose.

The architecture comprises a Client application (150) accessed through the browser of a user computer sending a request to a Web server (140) handled by the J2EE application server (110, 160) and starting a transaction for which the total processing time needs to be collected. The application server JVM will introduce a correlation id which will identify each component involved in the execution of a transaction and will log processing time for each running component in a log file included in the JVM and not represented in FIG. 1. As the correlation IDs will be stored in the Log file, it will be possible for a log analyzer tool to read the Log file to allow computation of the total processing time of one transaction.

In the illustrative embodiment, it will be a responsibility of the application assembler to define the proper correlation scope (optional), transaction boundary and transaction type so that this information is written into the application deployment descriptors. The assembler can modify the information written or left by the developer, and the administrator can modify the information written or left by the assembler. In a different embodiment, the new information will be directly entered by the developer or the administrator in the deployment descriptor at any time even after compilation.

It will be the Application server runtime responsibility to retrieve this DD information, create a new correlation ID and propagate it when managing the transaction within the transaction scope. The component execution information will comprise, according to the illustrative embodiment, the correlation ID as an additional information going along with the component processing time in the Log files of the application server.

The correlation ID is then used according to the transaction type by the Application Server runtime to track correlation records into the configured log files, or send them for further processing to collector agents such as ARM agents, IBM Tivoli Composite Application Manager agents, etc. (IBM and Tivoli are trademarks of IBM Corporation in certain countries). The administrator can see the logs from the application server console, and process them with a log analyzer tool.

According to the illustrative embodiment, a new component (115) of the JVM application server will perform computing of the correlation ID and tagging of the transaction related logged data tagging of the logged data. This component, the Asynchronous Correlation feature, may be activated by the administrator from the application server console. From the application server console, which can be remote, the administrator will also activate the Log files post processing program (117) for collecting the real transaction processing time which will help, for instance, for problem determination.

Figure 2:
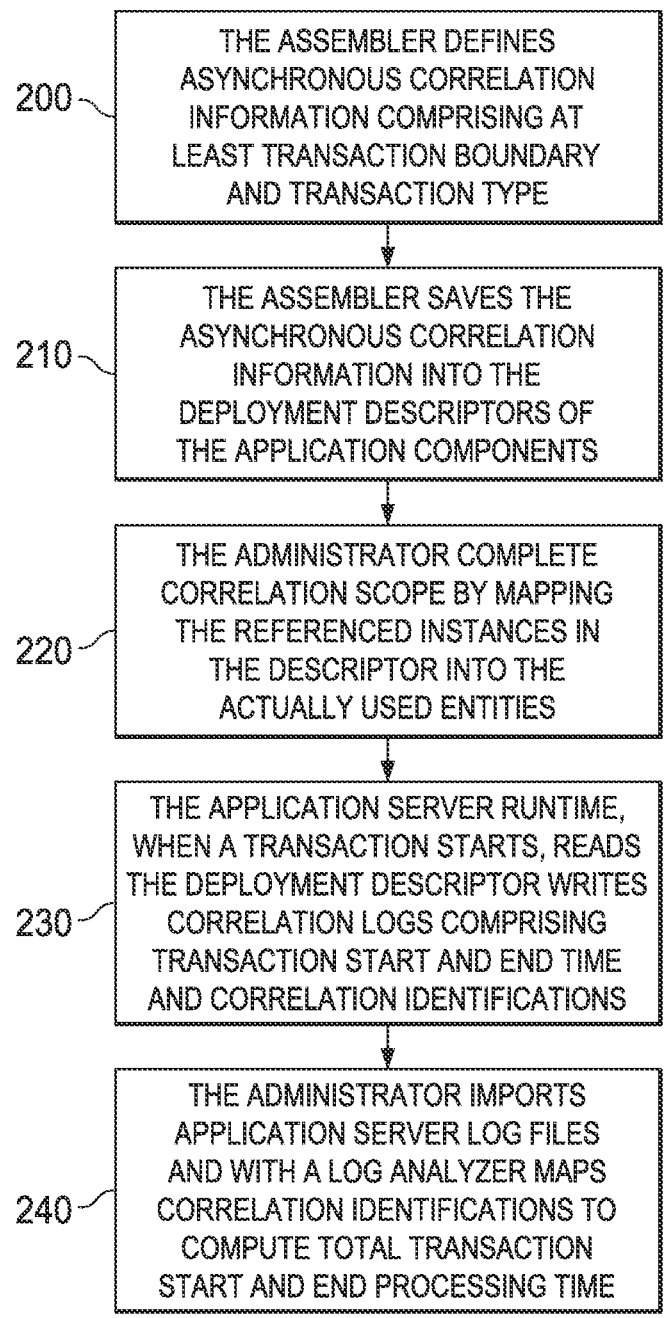
FIG. 2 is a flow chart illustrating operation of measuring transaction performance across application asynchronous flows according to an illustrative embodiment.

FIG. 2 is a flow chart illustrating operation of measuring transaction performance across application asynchronous flows according to an illustrative embodiment. The logical flow chart for gathering processing time of a transaction asynchronous component execution follows the step for creating a J2EE Java application running with the J2EE JVM application server. To create a J2EE Java application, the developer has first created different Java language modules such as EJBs (Enterprise Java Beans code to generate enterprise back-end business as opposed to front-end interface code), JSPs (JavaServer Pages code to generate HTML, XML, web pages), servlets (programs allowing to provide data to a web server through web pages), or stand-alone client applications. The Java application assembly is the first step for creating assembled applications for execution by the JVM application server. The assembler builds up the application package while taking care of the external dependency of the application in order to allow the Administrator to deploy the applications in the production environment. More precisely the J2EE assembler (the developer providing to the assembler the application structure information) links the application modules, edit J2EE module deployment parameters to describe application external dependencies. It creates the Deployment Descriptor for the application and the application components.

According to the illustrative embodiment, in the a first block (200) the application assembler defines for each component of the Java application running in the JVM application server some correlation information comprising at least the transaction boundary and the transaction type. The transaction boundary is the initial component (method of a servlet etc.) which will be involved in the flow started with the execution of the transaction. As discussed before, the execution of application component Java class methods can be asynchronous. This is a well-known point by the application assembler who is supposed to know the application and its flow.

Then, the assembler, which is in charge of creating the deployment descriptors, includes in the deployment descriptors (210) of the application components the correlation information which has been defined and which comprises the transaction boundary and the transaction type, besides asynchronous correlation name and other optional parameters like correlation scope, description and so on. All these parameters will be described in more detail in reference to FIG. 3.

The System Administrator enables an Asynchronous Correlation feature from the Application Server console, which also allows mapping (220) for instance through a GUI, the deployment descriptors fields to the referenced database instance that is part of the correlation scope to the actually used database, or defines the whole correlation scope (depending on what is left undefined by the application assembler).

As the Asynchronous Correlation feature is activated, when the asynchronous transaction takes place, the Application Server runtime, leveraging the deployment descriptors, is able to write correlation logs (230) containing matching a correlation ID corresponding to said transaction and transaction start and end time of the executing application component Java class methods participating in the same transaction.

After the transaction completes, the Administrator imports the Application Server log files into a log analyzer tool that picks up the matching correlation IDs and transaction times and displays the aggregated transaction (240). Details of possible correlation ID is better described later on in the document in reference to FIG. 4.

FIG. 3 shows an example of deployment descriptor attached to each component of applications running on a J2EE application server JVM including correlation information according to an illustrative embodiment. Under J2EE specifications a deployment descriptor is created by the assembler. The deployment descriptor is an XML file that describes how a component, module or enterprise application should be deployed. It informs the JVM Application Server how to deploy a module or application with specific container options, security settings and describes specific configuration requirements. Deployment descriptors are created for each web component, EJB component resource adapter and entire applications. For web modules (main components of an application), the deployment descriptor must be called web.xml and must reside in the WEB-INF directory under the web application module root. For the entire application, the deployment descriptor must be named application.xml and must be placed directly in the META-INF directory at the top level of the application .ear file.

The standard J2EE deployment descriptor XML files of the components (and not deployment descriptor of the entire application) as described in FIG. 3, are modified according to the preferred embodiment. A new correlation settings section (300) is added. As stated before, the assembler adds in the standard deployment descriptor of the application components a correlation information which is then updated by the administrator after assembly phase or after installation phase.

The example of FIG. 3 is a deployment descriptor of a web module having as name appearing on the server console 'MyWebModule' (310). This is a J2EE standard deployment descriptor of an application component modified according to the illustrative embodiment. Any other components such as an EJB module or a client application can have a similar deployment descriptor modified according to the illustrative embodiment. The standard deployment descriptor contains executable module information (320) to allow the application server to retrieve the Java classes to be executed for the web module. A security-role section (330) is also part of the J2EE standard deployment descriptor. The security-role section allows the JVM to filter capability of the web module to Role 1 after this generic name is mapped to a real user/group name (by the administrator or any other people having permissions to perform such operation).

A correlation settings section containing the correlation information is added according to the illustrative embodiment. In this example, and it is not mandatory, it is included before the security role section.

The correlation settings section comprises the transaction boundary name (301), which is the name of the piece of code in the component (a Java class method) which is involved in an asynchronous transaction. The 'MyServlet.writeObject' is the 'writeObject' method of MyServlet Java class of MyWebModule component. This method is of type 'write' ('transaction type' field) (302) this means this method has a 'producer' part in the asynchronous transaction scheme as described later on in the document in reference to description of FIG. 4. This method writes in a database table which is the MyDB.MyTable database table ('correlation-scope' field). As explained in FIG. 4 in the flow of asynchronous transactions the producer writes a message in a 'recipient' which can be a database table or a message queue depending on the application. The correlation scope represents the recipient that works as source or destination of the messages exchanged among the different actors in an asynchronous transaction. In the example of FIG. 3 it is a database table (303) but could be a queue-based messaging system, such as JMS, in-memory queues, etc. As a matter of fact, in one asynchronous transaction, at least one other method (which can be from the same application component or from one other component of the same application or one component of a different application) acts as a consumer and reads later on the message from the same recipient location. This is why more than one 'correlation-settings' section such as the one described in FIG. 3 can be added in a same component deployment descriptor.

The assembler which adds the new information in the component deployment descriptors can enter a generic name which is overridden by the administrator directly from the console by mapping the real database table name known in the system. Sharing between assembler part and administrator (or any authorized person) is optional in the scope of the illustrative embodiment.

FIG. 4 illustrates a transaction based on (Java Message Service) JMS, an asynchronous service, for which aspects of the illustrative embodiments may apply. The proposed embodiments are based on an improved mechanism in the assembly of J2EE applications and in the transaction management at application server side in order to provide a declarative way to propagate transaction correlation information among different flows of executions (i.e. processes, threads, applications, etc.). The illustrative embodiment comprises storing into the J2EE application deployment descriptors the information that instructs the application server to instrument the application for adding all the necessary glue code for managing transaction monitor and to propagate the correlation information among the different components involved in execution of the transaction.

As illustrated in FIG. 4 JMS is a messaging standard which allows application components based on the Java 2 Platform, Enterprise Edition (J2EE) to create, send, receive, and read messages. At least two main actors contribute to a global transaction with asynchronous flow: a producer (400) that creates a message and one or more consumers (420) that later on receives the message and start processing it, participating in an asynchronous transaction. The JMS message queue (410) is a staging area in which messages are queued; each message will be processed once independently of the order they have been received.

A similar schema exists for all asynchronous transactions under Java applications running on an application server JVM. An asynchronous transaction comprises 'transaction boundaries' which correspond to execution of a application component Java class method which may act as a producer and writing a message in a recipient which is here a JMS queue but which could be a location in a database table. The asynchronous transaction also comprises one other transaction boundary which corresponds to execution of an application component Java class method which acts as a consumer. Later on, it reads and processes the message which has been written in a location of the recipient. The dependent transactions (or the different operations) of an asynchronous transaction may be either of 'Write' or 'Read' type depending on whether they are producer or consumer.

Hereunder is described how the correlation settings section read from the deployment descriptor of FIG. 3 are used for evaluating processing time of an asynchronous transaction. Assuming that Application A contains a servlet S in which method M performs an insert in table T of database instance D, the application assembler will open the Asynchronous Correlation feature of its assembly tool, select A.S.M (method M in servlet S of application A) as transaction boundary, W (that is write) as transaction type and D.T (database table) as correlation scope.

Now, assuming an Application B contains the EJB E in which method M1 performs a read from the same table and uses the record that Application A previously queued to perform its task, the application assembler will select B.E.M1 as transaction boundary, R (read) as transaction type and the same D.T (database table) as correlation scope.

These settings are saved in both web.xml and ejb-jar.xml deployment descriptors (one for the servlet web module, the other one for the EJB module) to be later retrieved by the Application server runtime.

Even if the correlation scope can be set up at assembly time, it is possible that the database configuration that the application leverages is not known at assembly time. For this reason, it is more convenient to set up the correlation scope at deployment time or after installation has been performed. The administrator responsible of the deployment of the application in the production environment maps the referenced database instance onto the actually used instance. This is a common practice when dealing with J2EE resources and adds an additional level of flexibility to the solution.

When the Application Server manages the transaction for Application A (transaction management is performed by each J2EE Application Server) it creates a correlation ID for each write operation performed by the method M of the servlet S. The correlation ID will be composed by two parts: the first part is the identifier of the written record, which is for example D.T.ind0 where ind0 is the index that uniquely identifies a record in the table D.T.; the second part is the identifier of the caller, which is A.S.M. So the complete correlation ID will be "D.T.ind0-A.S.M".

When a situation like this happens, the Application Server runtime, if the Asynchronous Correlation feature is enabled, writes into the log files a record containing the correlation ID and the transaction start time.

In a similar way when the Application Server manages the transaction for Application B that reads the record D.T.ind0, it matches the EJB deployment descriptor and creates a second correlation ID that in this case will be "D.T.ind0-B.E.M1". Then, the Application Server runtime will log the correlation ID and the transaction end time.

It is noted that in case of transaction type R (read) the Application Server will log the transaction end time, while in case of W (write) the transaction start time, thus providing a correct measure of the transaction lifetime across asynchronous communication.

After the transaction is terminated and the System Administrator wants to correlate the events related to the transaction asynchronous flow that involved components of application A and B, he simply has to import log files and analyze them with the currently available log analyzer tools.

Properly filtering the logs to select the same correlation ID, and optionally enhancing the tool to perform automatic correlation and time aggregation, the Administrator will reach the results that cannot be achieved with the currently available tools. The two log records containing the same common part of the two correlation IDs which is "D.T.ind0" the total transaction processing time being end time of the read operation minus start time of the write operation. In this step is used the same root 'D.T.ind0' to link the main and dependent transactions, the second part of the correlation ID "D.T.ind0-B.E.M1" determining which component 'B.E.M1' took part in the transaction. In fact, the definition of the transaction elements in the descriptors just states that a transaction may occur, but only the actual log files can confirm that the transaction really pass for that component. Assuming is defined a transaction producer and 5 consumers in 5 different components, only 3 consumer components could be actually involved according to the logged information. This implies that these components from the second part of the correlation ID are written in the log files.

The asynchronous transaction logging according to the example provided here above is:
DT ind0-ASM start time
DT ind0-BEM1 end time
The asynchronous transaction processing time is:
DT ind0-BEM1 end time-DT ind0-ASM start time
The common correlation of the logged records is 'DT ind0'
The asynchronous transaction logging according to one other example could be:
DT ind1-ASM2 start time
DT ind1-BEM3 end time
The asynchronous transaction processing time would be in this second case:
DT ind1-BEM3 end time-DT ind1-ASM2 start time
The common correlation of the logged records is in this second case: 'DT ind1'

In the embodiments described above we referred to a queue represented by a database table. The idea presented here is actually generic and may be applied to any queue-based messaging system, such as JMS, in-memory queues, etc. The only difference is just in the way the system has to intercept the creation of the message by the boundary transaction and the reading of the messages by the dependent transaction(s) which are the different operations executed during an asynchronous transaction.

The illustrative embodiments described above may take the form of a computer program comprising instructions for carrying out the functions of the illustrative embodiments. The computer program is executed on a computing device. As known in the art, a typical computing device comprises at least one processor, a memory coupled to the processor for storing the instructions of the computer program, and a computer storage medium for storing the instructions of the computer program in persistent storage such that when the computer program is executed by the processor, the computer program causes the processor to perform the functions of the illustrative embodiments.

The invention claimed is:

1. A method for identifying processing time of asynchronous transactions in applications running on an application server virtual machine, wherein the asynchronous transactions involve execution in one application component of a producer application component, sending a message into a recipient, and execution in a consumer application component, the method comprising;
   modifying a deployment descriptor of each application component of an application including at least one producer application component or consumer application component, by adding, for each producer application component or consumer application component, an application component identifier, a producer or consumer type, and a recipient identifier of a recipient the application component uses;
   the application server virtual machine, when executing a transaction using a given application component, determining whether the given application component matches an application component identifier in the deployment descriptor of the given application;
   responsive to determining a match exists, the application server virtual machine logging:
      an identifier of a recipient containing a message sent by the given application component, a correlation identifier of the given application component and execution start time responsive to determining the given application component is of producer type; or
      an identifier of the recipient resource containing a message processed by the given application component, a correlation identifier of the given application component, and an execution end time responsive to determining the given application component is of consumer type; and
   determining, by the application server virtual machine, processing time for the transaction based on the execution start time and the execution end time.

2. The method of claim 1, wherein modifying the deployment descriptor of each application component is performed at application assembly time.

3. The method of claim 2, wherein the recipient identifier is a generic name.

4. The method of claim 1, wherein modifying the deployment descriptor of each application component is performed at application deployment time.

5. The method of claim 1, wherein the recipient identifier is a database table identifier.

6. The method of claim 1, wherein the recipient identifier is a queue identifier.

7. The method of claim 1, wherein determining the processing time for the transaction comprises:
   mapping correlation identifiers of records logged by the application server virtual machine;
   identifying a record with an execution start time and a record with an execution end time having matching correlation identifiers; and
   computing processing time for the transaction by subtracting the execution start time from the execution end time.

8. The method of claim 7, wherein computing processing time for the transaction is performed by an application response measurement (ARM) agent.

9. The method of claim 7, wherein computing processing time for the transaction is performed by a composite application manager agent.

10. A computing device for identifying processing time of asynchronous transactions in applications running on an application server virtual machine, wherein the asynchronous transactions involve execution in one application component of a producer application component, sending a message into a recipient, and execution in a consumer application component, the computing device comprising:

a processor; and a memory coupled to the processor, wherein the memory comprises instructions which, when executed by the processor, cause the processor to:

modify a deployment descriptor of each application component of an application including at least one producer application component or consumer application component, by adding, for each producer application component or consumer application component, an application component identifier, a producer or consumer type, and a recipient identifier of a recipient the application component uses;

determine, by the application server virtual machine when executing a transaction using a given application component, whether the given application component matches an application component identifier in the deployment descriptor of the given application:, responsive to determining a match exists, log, by the application server virtual machine:

an identifier of a recipient containing a message sent by the given application component, a correlation identifier of the given application component, and an execution start time responsive to determining the given application component is of producer type; or an identifier of the recipient resource containing a message processed by the given application component, a correlation identifier of the given application component, and an execution end time responsive to determining the given application component is of consumer type; and determine, by the application server virtual machine, processing time for the transaction based on the execution start time and the execution end time.

11. The computing device of claim 10, wherein modifying the deployment descriptor of each application component is performed at application assembly time.

12. The computing device of claim 11, wherein the recipient identifier is a generic name.

13. The computing device of claim 10, wherein modifying the deployment descriptor of each application component is performed at application deployment time.

14. The computing device of claim 10, wherein the recipient identifier is a database table identifier.

15. The computing device of claim 10, wherein the recipient identifier is a queue identifier.

16. The computing device of claim 10, wherein determining the processing time for the transaction comprises:

mapping correlation identifiers of records logged by the application server virtual machine;

identifying a record with an execution start time and a record with an execution end time having matching correlation identifiers; and computing processing time for the transaction by subtracting the execution start time from the execution end time.

17. The computing device of claim 16, wherein computing processing time for the transaction is performed by an application response measurement (ARM) agent.

18. The computing device of claim 16, wherein computing processing time for the transaction is performed by a composite application manager agent.

19. A computer program product comprising a non-transitory computer readable storage medium having a computer readable program stored therein, the computer readable program for identifying processing time of asynchronous transactions in applications running on an application server virtual machine, wherein the asynchronous transactions involve execution in one application component of a producer application component, sending a message into a recipient, and execution in a consumer application component, wherein the computer readable program, when executed on a computing device, causes the computing device to:

modify a deployment descriptor of each application component of an application including at least one producer application component or consumer application component, by adding, for each producer application component or consumer application component, an application component identifier, a producer or consumer type, and a recipient identifier of a recipient the application component uses:

determine, by the application server virtual machine when executing a transaction using a given application component, whether the given application component matches an application component identifier in the deployment descriptor of the given application;

responsive to determining a match exists, log, by the application server virtual machine:

an identifier of a recipient containing a massage sent by the given application component, a correlation identifier of the given application component, and an execution start time responsive to determining the given application component is of producer type; or an identifier of the recipient resource containing a message processed by the given application component, a correlation identifier of the given application component, and an execution end time responsive to determining the given application component is of consumer type; and determine, by the application server virtual machine, processing time the transaction based on the execution start time and the execution end time.

20. The computer program product of claim 19, wherein determining the processing time for the transaction comprises:

mapping correlation identifiers records logged by the application server virtual machine;

identifying a record with au execution start time an execution end time having matching correlation identifiers; and computing processing time for the transaction by subtracting the execution start time from the execution end time.

21. The computer program product of claim 20, wherein computing processing time for the transaction is performed by an application response measurement (ARM) agent.

22. The computer program product of claim 20, wherein computing processing time for the transaction is performed by a composite application manager agent.

23. The computer program product of claim 19, wherein modifying the deployment descriptor of each application component is performed at application assembly time.

24. The computer program product of claim 23, wherein the recipient identifier is a generic name.

25. The computer program product of claim 19, wherein modifying the deployment descriptor of each application component is performed at application deployment time.

26. The computer program product of claim 19. wherein the recipient identifier is a database table identifier.

27. The co r program product of claim 19, wherein the recipient identifier is a queue identifier.

* * * * *